3,772,263
**MANUFACTURE OF AMORPHOUS POLYBUTA-
DIENE WITH A HIGH CONTENT OF 1,2 UNITS**
François Dawans, Bougival, and Pierre Amigues, La
Muladiere, France, assignors to Institut Francais du
Petrole des Carburants et Lubrifiants, Rueil-Malmaison,
France
No Drawing. Filed Nov. 8, 1971, Ser. No. 196,718
Claims priority, application France, Nov. 23, 1970,
7042059
Int. Cl. C08d *1/14, 3/06, 3/08*
U.S. Cl. 260—94.3                                10 Claims

ABSTRACT OF THE DISCLOSURE

Process for the selective conversion of 1,3-butadiene to amorphous polybutadiene, having 70–98% of the vinyl structure, in the presence of a catalyst consisting of a mixture of a molybdenum halide or oxyhalide with a monoalkoxydialkylaluminum compound, comprising the improvement of adding to the reaction medium at least one ester of a carboxylic acid. This addition enhances the activity of the catalyst which is soluble in the hydrocarbon medium and provides for a much easier and more reproducible Polymerization with a better control of the polymer molecular weight and an easier purification of the polymer.

---

This invention relates to improvements in the polymerization of 1,3-butadiene to useful polymers having a high content of vinyl units. The applicant has already described the use of catalysts based on molybdenum halides or oxyhalides and monoalkoxydialkylaluminum for polymerzing 1,3-butadiene to amorphous polymers comprising essentially 1,2 units and having interesting properties (French Pat. No. 1,493,422 filed on Sept. 24, 1965 or U.S. Pat. No. 3,451,987). In this process, the polymerization is preferably carried out in the presence of aromatic or aliphatic hydrocarbons, the molybdenum compound being introduced into the reactor either in the solid state, or as a suspension. Under these conditions, the polymerization was initiated in a heterogeneous medium and, at the end of the reaction, the reaction mixture had to be treated in order to deactivate and thereafter separate the residual catalyst; this treatment was often difficult to conduct due to the heterogeneity of the medium, the major part of the catalyst being finely embedded in the polymer. The polymerization could not be carried out in the homogeneous phase heretofore, unless the catalytic species were treated in a performing step i. e. the components of the catalyst system were reacted in the presence of a minor proportion of butadiene, preferably from 1 to 20 moles of butadiene per mole of the molebdenum compound; but such a preforming operation is disadvantageous in a continuous polymerization process.

It has now found and this is one of the objects of the present invention, that the polymerization of butadiene by means of the above-mentioned catalysts, may be advantageously carried out in the presence of esters of carboxylic acids used as additives to the molybdenum compound; the catalyst system, the activity of which is moreover enhanced, is then completely soluble in the hydrocarbon medium so that the polymerization in the homogeneous phase may be initiated without requiring the disadvantageous preforming operation as above-mentioned.

One of the improvements according to the present invention provides a process for manufacturing high molecular weight amorphous polymers of 1,3-butadiene having preferentially a 1,2 structure, in the presence of a catalyst obtained from monoalkoxydialkylaluminum compounds and molybdenum compounds, in which process the polymerization is conducted in the homogeneous phase, in the presence of at least one ester of a carboxylic acid. The use of the catalyst system in the form of a solution is thus greatly simplified and furthermore makes it possible to carry out the polymerization in a consistently reproducible manner. Besides, such a process provides means for controlling the molecular weight of the polymer and facilitates a later purification thereof.

The conversion rate to polybutadiene, essentially 1,2-polybutadiene, varies substantially linearly as a function of the reaction time up to about 75% and the polymerization velocity is directly proportional to the initial concentrations of molybdenum compound and of 1,3-butadiene. The molar ratios Al/Mo are higher than 0.9 and preferably between 2 and 10.

Another improvement results from the addition of an ester of a carboxylic acid to the catalyst system whereby the polymerization reaction of 1,3-butadiene can be initiated in the presence of very small initial concentrations of molybdenum (e.g. from 1 to 0.01 milliatom of molybdenum per liter of reaction solution).

Another advantage according to the invention results from the fact that it is possible to vary, to a certain extent, and at will, the content of 1,2 units of the obtained polymers; as a matter of fact, in accordance with the amount of ester of carboxylic acid added to the polymerization medium, there can be prepared amorphous polybutadienes containing from 98 to 70% of 1,2 units, the unsaturation complement being essentially in the form of 1,4 trans. By this way, there can be obtained a range of polybutadiene with high contents of vinyl units and having a glass transition temperature in most cases between —15 and —50° C. The so-obtained improved control of the low temperature properties of the polymers according to the invention allows a wider adaptation of the products to various uses.

When carrying out the polymerization according to the present invention, not only the produced polymers remain essentially in the amorphous state, as shown by their solubility in diethylether, but also there is observed but a few or no secondary reactions such as intramolecular cyclization or cross-linking during their formation; accordingly the resulting polymers have a very high degree of unsaturation (in most cases higher than 96%) and they are substantially free of cross-linked structures (gel content generally lower than 300 p.p.m.). This is another improvement in the manufacture of polybutadiene having mainly a 1,2 structure and a high molecular weight.

Another improvement in the process of the invention consists in the possibility of stereospecific polymerization of 1,3-butadiene in the presence of various other saturated or unsaturated hydrocarbons, without changing significantly the catalytic activity and the microstructure or the molecular weight of the polymer obtained under these conditions. Accordingly, polybutadienes of high molecular weights and with a high content of 1,2 units may be prepared in an economically advantageous manner according to the invention, starting from mixtures with a high content of butanes, butenes and butadienes, resulting for example from the steam-cracking of naphthas or from the dehydrogenation of butanes and butenes. Besides, it is possible, under these conditions, to polymerize, with a satisfactory rate of reaction, substantially all the 1,3-butadiene contained in the mixture, and consequently, to use up the 1,3-butadiene contained in the treated hydrocarbon cut, thereby avoiding the optional recycling thereof and providing finally a $C_4$ cut which is industrially valuable.

The high catalytic activity and the stereoselectivity observed according to the invention are specific not only to the catalytic pair used but also to the use of an ester of carboxylic acid as the additive to the molybdenum compound. In fact, the use as additives of other derivatives of carboxylic acids, such as acid halides, aldehydes, alcohols, ketones, amides, etc. either substantially or completely inhibits the polymerization reaction, or changes the stereospecificity of the catalyst.

Generally, all the esters of carboxylic acids which are inert with respect to the monoalkoxydialkylaluminum compound and in which the molybdenum compound is soluble, in catalytic amounts (for example soluble in a proportion of at least 10 milliatoms of molybdenum per liter), may be used advantageously according to the present invention; however, for reasons of availability and cost, it will be preferred to use ethyl acetate.

Small amounts of ester in the reaction medium are generally sufficient to obtain the above-mentioned advantages and, consequently, it will be preferred to use from 1 to 20% by volume of ester.

The following Examples 1 to 10, which do not limit the scope of the invention, are given for illustrating the improvements in the preparation of amorphous polybutadiene with a high content of 1,2 units, according to the invention.

EXAMPLE 1

To a solution of 28 g. of 1,3-butadiene in 140 cc. of toluene, there are added 13.5 cc. of a 0.2 mole/liter solution of $(C_2H_5)_2AlOC_2H_5$ in toluene and 3.5 cc. of a 0.2 mole/liter solution of $MoCl_5$ in ethyl acetate, which represents 1.7% by volume of ethyl acetate in the starting reaction medium. The reaction mixture is stirred at 50° C. for one hour and the reaction is then terminated in a conventional manner, e.g., by addition of an alcohol which may contain an antioxidant agent and a base in aqueous solution for destroying the catalyst. The polymer is separated by precipitation in an alcohol, followed by filtration, and it is dried at 40° C., under reduced pressure, up to a constant weight. There are thus obtained 25 g. of amorphous polybutadiene, soluble in diethyl ether; the microstructure of the polymer, determined by I.R. spectrometry, according to the Ciampelli and Coll. Method (La Chimica e l'Industria, 41, 758 (1959)) consists of 96% of 1,2 units and 4% of 1,4 trans units. The intrinsic viscosity $[\eta]$ of a solution of polymer in toluene, measured at 30° C., is 3.07 dl./g. The glass transition temperature of the sample ($T_g$) determined by differential thermal analysis, is about −26° C.

EXAMPLES 2–5

Using the same conditions as in Example 1, increasing amounts of ethyl acetate are added to the polymerization medium, all other conditions being unchanged, and the polymerization is conducted at 30° C. for 1 hour. The obtained results are given in the following Table 1.

TABLE 1

| Example Number | Ethyl acetate, volume percent | Percent conversion to polybutadiene | Polymer microstructure Percent 1,2 | Percent 1,4 trans | $[\eta]$ 30° C. toluene, dl./g. | $T_g$, ° C. |
|---|---|---|---|---|---|---|
| 2 | 2 | 56 | 93 | 7 | 3.02 | −33 |
| 3 | 10 | 43 | 89 | 11 | 2.99 | −42 |
| 4 | 20 | 37 | 86 | 14 | 2.95 | −47 |
| 5 | 30 | 32 | 84 | 16 | 3.11 | −49 |

EXAMPLE 6

To a solution of 28 g. of 1,3-butadiene in 338 cc. of toluene, there are added 12 cc. of a 2 moles/liter solution of $(C_2H_5)_2AlOC_2H_5$ in toluene and 6 cc. of a 1 mole/liter solution of $MoCl_5$ in ethyl acetate. After 1 hours at 50° C., there are obtained 23 g. of polybutadiene having a content of 1,2 units higher than 95%, and an intrinsic viscosity of 1.45 dl./g.

EXAMPLE 7

A 16 liter toluenic solution of 4 moles/liter of 1,3-butadiene, 0.075 millimole/liter of $MoCl_5$, added in the form of a 0.2 mole/liter solution in ethyl acetate, and 0.45 millimole/liter of $(C_2H_5)_2AlOC_2H_5$, is stirred at 45° C. for 20 hours. There is thus obtained a 19% conversion to polybutadiene containing more than 97% of 1,2 units and whose Mooney viscosity, measured at 100° C. according to the French standard NF 4305 is equal to 52 ML (1+4).

EXAMPLE 8

A 12 liter toluenic solution of 4 moles/liter of 1,3-butadiene, 0.74 millimole/liter of $MoCl_5$, added in the form of a 0.2 mole/liter solution ethyl acetate, and 4.24 millimoles/liter of $(C_2H_5)_2AlOC_2H_5$ is stirred at 45° C. for 2 hours and a half. The conversion to polybutadiene amounts to 39%; the microstructure of the polymer consists of 95% of 1,2 units and 5% of 1,4 trans units; the intrinsic viscosity of the polymer is 7 dl./g. and its gel content determined according to the method ASTM E 11 No. 100, is lower than 300 p.p.m.

EXAMPLE 9

Example 1 is repeated except that the 1,3-butadiene solution in toluene is replaced by a solution of 110 cc. of a $C_4$ hydrocarbon cut containing 39.23% by weight of 1,3-butadiene in 73 cc. of toluene. Besides the 1,3-butadiene, the composition by weight of the $C_4$ cut, determined by gaseous chromatography is as follows: 6.67% of saturated $C_3$ to $C_5$ hydrocarbons, 17.46% of 1-butene, 24.14% of isobutene, 11.40% of cis and trans 2-butene and 0.10% of acetylenics. After 1 hour of reaction at 50° C., there are obtained, everything being otherwise unchanged, using the experimental conditions of Example 1, 20 g. of polybutadiene having a microstructure consisting of 96% of 1,2 units and 4% of 1,4 trans units. The intrinsic viscosity of the polymer is equal to 2.91 dl./g. The mean weight, numerically expressed, as determined by osmometry, is equal to 417,000.

When continuing the polymerization reaction for 2 hours, there are finally obtained 27 g. of polymer, which means that more than 96% of the 1,3-butadiene contained in the starting hydrocarbon cut, has been converted to amorphous 1,2-polybutadiene.

EXAMPLE 10

7 cc. of a 2 moles/liter solution of $(C_2H_5)_2AlOC_2H_5$ in toluene are added to 3.5 cc. of a 1 mole/liter solution of $MoCl_5$ in ethyl acetate; there is then added a solution of 102 cc. of a hydrocarbon mixture containing 42% by weight of 1,3-butadiene, in 87 cc. of toluene. The hydrocarbon mixture used was directly withdrawn from a steam-cracking cut and, in addition to 1,3-butadiene, contains 4.46% of $C_3$ to $C_5$ saturated hydrocarbons, 16.42% of 1-butene, 26.29% of isobutene, 10.20% of cis and trans 2-butenes and 0.53% of acetylenics. After stirring the reaction mixture at 50° C., for 90 minutes, there are obtained 19 g. of polybutadiene having an intrinsic viscosity of 1.55 dl./g. The microstructure of the polymer consists of 90% of 1,2 units and 10% of 1,4 trans units and the glass transition temperature of the polymer is about −40° C.

What we claim is:

1. In a process for the selective conversion of 1,3-butadiene to amorphous polybutadiene of 70–98% vinyl structure, in the presence of a catalyst consisting essentially of a mixture of a molybdenum halide or oxyhalide with a monoalkoxydialkylaluminum compound, the improvement of adding to the reaction medium at least one ester of a carboxylic acid in an amount sufficient to dissolve a catalytic quantity of said molybdenum halide or oxyhalide but less than that amount which would otherwise result in the production of amorphous polybutadiene having less than 70% of 1,2 units, said ester being inert with respect to the monoalkoxydialkylaluminum compound and being capable of dissolving catalytic amounts of said molybdenum halide or oxyhalide.

2. The process according to claim 1 wherein the ester is an ester of acetic acid.

3. The process according to claim 1, wherein the ester is ethyl acetate.

4. The process according to claim 1, wherein the ester of carboxylic acid amounts to 0.2 to 40% by volume of the reaction medium.

5. The process according to claim 1, wherein the ester of carboxylic acid amounts to 1 to 20% by volume of the reaction medium.

6. The process according to claim 1 wherein the conversion is carried out in the presence of at least one hydrocarbon other than 1,3-butadiene.

7. The process according to claim 1, wherein 1,3-butadiene is used in the form of a $C_4$ hydrocarbon cut from the steam-cracking of naphthas.

8. The process according to claim 1, wherein 1,3-butadiene is in the form of a $C_4$ hydrocarbon cut from the dehydrogenation of butanes and/or butenes.

9. The process according to claim 1, wherein a solution of the molybdenum halide or oxyhalide in said ester is added to the reaction medium.

10. The process according to claim 9, wherein the ester is ethyl acetate.

References Cited
UNITED STATES PATENTS

| | | | |
|---|---|---|---|
| 3,223,694 | 12/1965 | Farrar | 260—94.3 |
| 3,336,280 | 8/1967 | Naylor | 260—94.3 |
| 3,451,987 | 6/1969 | Dawans et al. | 260—94.3 |
| 3,457,250 | 7/1969 | Gaeth | 260—94.3 |

JOSEPH L. SCHOFER, Primary Examiner

W. F. HAMROCK, Assistant Examiner

U.S. Cl. X.R.

260—429 B